United States Patent
Tam et al.

(10) Patent No.: US 10,558,038 B2
(45) Date of Patent: Feb. 11, 2020

(54) INTERPUPILLARY DISTANCE ADJUSTMENT MECHANISM FOR A COMPACT HEAD-MOUNTED DISPLAY SYSTEM

(71) Applicant: Sharp Kabushiki Kaisha, Osaka (JP)

(72) Inventors: Ka Ho Tam, Oxford (GB); David James Montgomery, Oxford (GB); Scott Wells, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 48 days.

(21) Appl. No.: 15/923,046

(22) Filed: Mar. 16, 2018

(65) Prior Publication Data

US 2019/0285880 A1 Sep. 19, 2019

(51) Int. Cl.
  *G02B 27/01* (2006.01)
  *G02B 27/00* (2006.01)
  *G02B 17/00* (2006.01)

(52) U.S. Cl.
  CPC .......... *G02B 27/01* (2013.01); *G02B 17/004* (2013.01); *G02B 17/008* (2013.01); *G02B 27/0081* (2013.01); *G02B 27/0101* (2013.01); *G02B 27/017* (2013.01); *G02B 27/0149* (2013.01);
  (Continued)

(58) Field of Classification Search
  CPC .............. G02B 27/0081; G02B 17/004; G02B 17/008; G02B 27/01; G02B 27/017; A61B 3/111
  See application file for complete search history.

(56) References Cited

U.S. PATENT DOCUMENTS

| 2002/0113755 | A1* | 8/2002 | Lee | .......................... G02B 7/12 345/7 |
| 2006/0250322 | A1* | 11/2006 | Hall | .................... G02B 27/0172 345/8 |

(Continued)

FOREIGN PATENT DOCUMENTS

| CN | 107015363 | 8/2017 |
| CN | 206805007 | 12/2017 |
| WO | WO 2014163869 | 10/2014 |

*Primary Examiner* — Cara E Rakowski
*Assistant Examiner* — Magda Cruz
(74) *Attorney, Agent, or Firm* — Renner, Otto, Boisselle & Sklar, LLP

(57) ABSTRACT

A head-mounted display (HMD) system includes an optical arrangement; at least one moveable image panel, wherein the optical arrangement directs image light from the moveable image panel along a first optical pathway; a fixed image panel, wherein a portion of image light emitted from the fixed image panel is combined with image light of the at least one moveable image panel by the optical arrangement; and an adjustment mechanism that is configured to adjust an interpupillary distance (IPD) of the HMD system by moving the optical arrangement and the moveable image panel relative to the fixed image panel between a first position and a second position corresponding to different IPDs. The adjustment to the IPD maintains the first optical pathway. The HMD system further may include a sensing module that measures an adjustment position of the optical arrangement, and control electronics configured that determines the IPD based on the measured adjustment position, and updates image light emitted by the fixed image panel based on the IPD.

19 Claims, 6 Drawing Sheets

(52) U.S. Cl.
CPC ..... *G02B 27/0172* (2013.01); *G02B 27/0179* (2013.01); *G02B 2027/0181* (2013.01)

(56) References Cited

U.S. PATENT DOCUMENTS

| | | | |
|---|---|---|---|
| 2013/0162675 A1* | 6/2013 | Matsushima | G09G 5/377 345/633 |
| 2014/0274391 A1* | 9/2014 | Stafford | G06F 3/013 463/32 |
| 2014/0375681 A1* | 12/2014 | Robbins | G06T 19/006 345/633 |
| 2017/0111636 A1* | 4/2017 | Hasegawa | G02B 7/12 |
| 2018/0031848 A1* | 2/2018 | Huang | G02B 27/017 |
| 2019/0155021 A1* | 5/2019 | Wall | G02B 26/085 |

* cited by examiner

INTERPUPILLARY DISTANCE ADJUSTMENT MECHANISM FOR A COMPACT HEAD-MOUNTED DISPLAY SYSTEM

TECHNICAL FIELD

The present invention has application within the field of compact wearable displays, and in particular, head-mounted display (HMD) systems used for applications such as virtual reality and augmented reality.

BACKGROUND ART

A head-mounted display (HMD) system is a type of wearable device with increasing popularity within the consumer electronics industry. HMDs, along with similar devices such as helmet-mounted displays, smart glasses, and virtual reality headsets, allow users to wear a display device such that the hardware remains fixed to their heads regardless of the user's movement.

When combined with environmental sensors such as cameras, accelerometers, gyroscopes, compasses, and light meters, HMDs can provide users with experiences in virtual reality and augmented reality. Virtual reality (VR) allows a user to be completely submerged into a virtual world where everything the user sees comes from the display device. Devices that provide augmented reality (AR) allow users to optically see the environment, and images generated by the display device are added to the scene and may blend in with the environment. Accordingly, traditional VR and AR technology involve a display that is mounted in front of the user's head with a lens configuration that determines the virtual image position and field.

A basic layout of typical commercial VR or AR systems (both involving and not involving use of a smartphone for a display) includes a display device and a lens structure that images the display light into the far field to enable comfortable viewing. To ensure sufficient magnification, with wide field of view and to have a virtual image at a far enough distance from the eye, the size of this arrangement is restricted. In addition, the display is a relatively far distance from the eyes, meaning that the device must be strapped to the head to not fall off. Furthermore, the weight of the device is far forward when worn, meaning that long term viewing could become tiresome on the face and neck due to the torque generated about the head by the weight of the device. Lens elements used in such systems may be configured as a normal curved surface lens of known type, or a structured Fresnel lens with angled features of known type, or other known lens arrangements involving one or more lenses.

One of the primary elements of HMDs is the display module mounted onto the head. However, since the unaided human eye cannot accommodate (that is, change optical power to provide a focused image) for images closer than a certain distance from the eye, eyepiece lenses are required to re-image the display module such that the display image appears to be at a comfortable viewing distance from the user. Such an optical configuration requires substantial space between the eyepiece and the display module. Furthermore, complex lenses are needed if the HMD needs to display images with high quality and a wide field of view (FOV). The result of these requirements in conventional systems is a heavy and bulky headset that is uncomfortable to wear for any length of time, and the size is limited by basic optics to achieve the correct magnification and the virtual image distance.

The distance separating a person's eyes is known in the art as the interpupillary distance (IPD), which for adults tends to range from around 50 mm to 70 mm. For optimal image quality, a corresponding IPD of the eyepiece lens components of an HMD system should match the IPD of the user. A typical HMD that uses fixed optics will show aberrations if the user's IPD is significantly different from the IPD specified by the HMD's optical design. To minimize these aberrations, an HMD may have optics that can be physically adjusted to accommodate the specific IPD of the user.

There are a number of conventional methods that are commonly used to adjust the IPD for HMDs. For example, many commercial HMDs employ a physical mechanism that allows the user to change the distance separating the eyepiece lenses. For example, CN 206805007 (filed Dec. 26, 2017) describes a method for adjusting interpupillary distance of an HMD using a scissor-type connector and screw. CN107015363 (Huang, published Aug. 4, 2017) describes a method for adjusting interpupillary distance using a rack and pinion mechanism. The IPD value used to render images onto the display is then changed either in software to a set value, or automatically though a sensing system that senses the positioning of the system eyepieces. The image displayed on the display panel is then adjusted accordingly. For example, WO 2014163869 (Stafford, published Oct. 9, 2014) describes a method for adjusting interpupillary distance in an HMD and subsequently updating the images displayed. In all these systems, the display panel remains fixed within the HMD and the optical components of the eyepieces are moved relative to the display panel.

There have been other attempts to reduce HMD form factor using multiple small lenses with overlapping images that modify the magnification required. For example, Applicant's commonly owned Application GB 1621621.0, filed Dec. 19, 2016, describes an alternative image overlap system with two displays and a folded W-shaped mirror arrangement. The field of view in this case is defined by the maximum aperture and path length. Although such a system reduces the overall form factor during use as compared to prior conventional configurations, in this initial design a mechanism of adjusting the IPD optimized for such a system is not described.

SUMMARY OF INVENTION

There is a need in the art, therefore, for an enhanced HMD system that is compact and comfortable to wear, without sacrificing image quality as needed for optimal VR and AR applications, and that permits adjusting the IPD of the HMD system to match the IPD of a user. The present invention provides for separation of the eyepieces and optical components for each eye, which can be adjusted to match the IPD of the user. The HMD system includes a shared central image panel located between two peripheral unshared image panels, and the peripheral image panels along with the eyepiece optics are free to move relative to the central image panel. An advantage of this configuration is that a user can customize the IPD of the HMD system to match the user's specific IPD to maximize image quality of the HMD system.

Regarding the overall form factor, the HMD system of the present disclosure improves the compactness of the system while using a folded optical arrangement. Configurations of the HMD system employ a combination of image panels that are on the eye or viewing side of the eyepiece lenses, close to the head, and also image panels that are on the image or non-viewing side of the eyepiece lenses. An advantage of such arrangement is that the HMD system protrudes from the face for a distance less than previous designs, and therefore can have a significantly reduced weight, be much closer to the face, and hence produce less fatigue while wearing. The design also means near-eye optics can be used to give a large FOV, but also allows space for the user's nose to provide a more comfortable configuration to wear.

In exemplary embodiments, an HMD system includes three image panels of equal dimensions. A first image panel and a second image panel are respectively used to present an image in an unshared fashion respectively to each of the left eye and the right eye. The HMD system further includes a third image panel that is located centrally relative to the first and second image panels, and the third image panel presents an image that is shared between both left and right eyes. With such configuration, each of the left and right eyes can see two image panels, one in its entirety (the unshared first and second image panels) and half of the third shared central image panel that is shared by both eyes. Further with such a configuration, images from the various image panels are combined such that the images optimally fill the typical human visual field.

The described configuration has an advantage in that there is as little unseen area on the image panels as practicable, which minimizes the form factor of the HMD system. In addition, with such a configuration the optical arrangement allows plenty of room for the user's nose. Furthermore, the weight is concentrated closer to the user's head, so the torque on the head and neck is reduced, and the conventional requirement for a strap to wear the system becomes less necessary. The result is an enhanced HMD system that is compact and comfortable to wear, without sacrificing image quality as needed for optimal VR and AR applications.

In exemplary embodiments, the peripheral unshared image panels, along with the optical components of the eyepieces, are free to move relative to the central image panel, in a manner that does not change the optical pathways of image light from the peripheral image panels. As a result, only the image light emitted from the central image panel needs to be updated to accommodate the physical adjustment of the HMD system for adjustment of the IPD.

The IPD of the HMD system is adjusted by the user through operation of a suitable adjustment mechanism. For example, the adjustment mechanism may be configured as a knob-and-screw mechanism, by which the user adjusts the IPD by rotating an adjustment knob to rotate cooperating adjustment screws. Threaded connectors are attached to the optical system so that the position of the optical arrangement adjusts with the rotation of the adjustment knob, which results in turn in the adjustment of the IPD. The threaded connectors and adjustment screws are threaded such that both the threaded connectors move towards or away from the adjustment knob as the adjustment knob is rotated. In addition, in exemplary embodiments a sensing module measures the IPD of the HMD system, and the image light emitted from the central image panel is automatically updated based on the measured IPD.

An aspect of the invention, therefore, is a head-mounted display (HMD) system having an enhanced image panel configuration combined with an optimal adjustment mechanism. In exemplary embodiments, the HMD system includes an optical arrangement; at least one moveable image panel, wherein the optical arrangement directs image light from the moveable image panel along a first optical pathway; a fixed image panel, wherein a portion of image light emitted from the fixed image panel is combined with image light of the at least one moveable image panel by the optical arrangement; and an adjustment mechanism that is configured to adjust an interpupillary distance (IPD) of the HMD system by moving the optical arrangement and the moveable image panel relative to the fixed image panel between a first position and a second position corresponding to different IPDs; wherein the adjustment to the IPD maintains the first optical pathway. The HMD system further may include a sensing module configured to measure an adjustment position of the optical arrangement, and control electronics configured to determine the IPD based on the measured adjustment position, and to update image light emitted by the fixed image panel based on the IPD.

In exemplary embodiments, the at least one moveable image panel includes a peripheral first image panel, wherein the optical arrangement directs image light from the first image panel along a first optical pathway; a peripheral second image panel, wherein the optical arrangement directs image light from the second image panel along a second optical pathway different from the first optical pathway; and a central image panel located between the peripheral first and second image panels, the central image panel including a first panel portion and a second panel portion. The optical arrangement directs light from the first panel portion and the second panel portion of the central image panel along different optical pathways. The optical arrangement is configured such that light from the first image panel and the first panel portion of central image panel are emitted from the HMD system in a combined fashion in a first eye direction, and light from the second image panel and the second panel portion of the central image panel are emitted from the HMD system in a combined fashion in a second eye direction different from the first eye direction. The adjustment to the IPD maintains the first optical pathway and the second optical pathway, and alters the positions of the first and second image panel portions of the central image panel, and operating the adjustment mechanism moves the first and second image panels relative to the central image panel.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Figure 1:
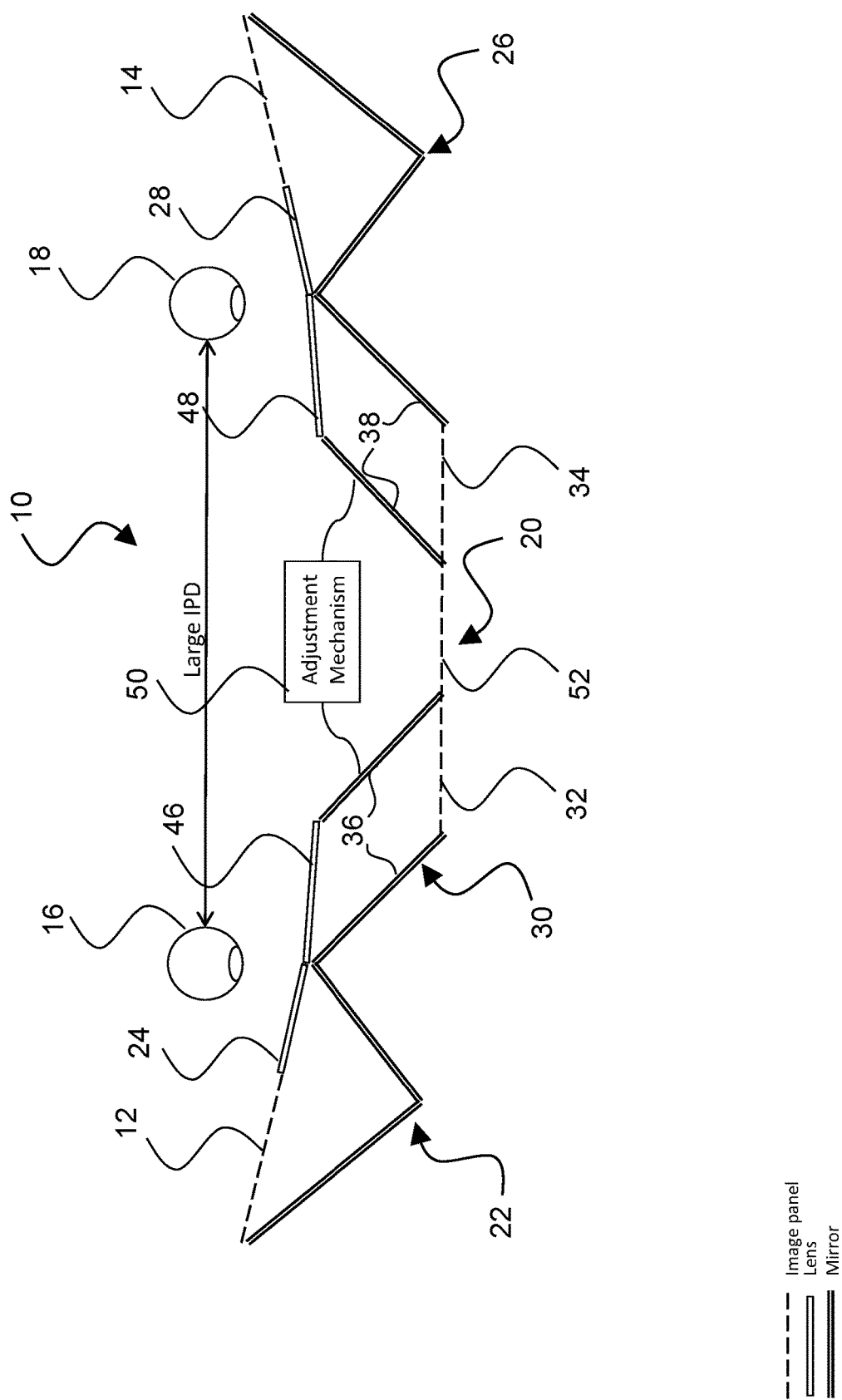
FIG. 1 is a drawing depicting a top view of an exemplary head-mounted display (HMD) system in accordance with embodiments of the present invention, with the HMD system being in a first position of relatively large IPD.

Embodiments of the present invention will now be described with reference to the drawings, wherein like reference numerals are used to refer to like elements throughout. It will be understood that the figures are not necessarily to scale.

Generally, an aspect of the invention is a head-mounted display (HMD) system having an enhanced image panel configuration combined with an optimal adjustment mechanism. In exemplary embodiments, the HMD system includes an optical arrangement; at least one moveable image panel, wherein the optical arrangement directs image light from the moveable image panel along a first optical pathway; a fixed image panel, wherein a portion of image light emitted from the fixed image panel is combined with image light of the at least one moveable image panel by the optical arrangement; and an adjustment mechanism that is configured to adjust an interpupillary distance (IPD) of the HMD system by moving the optical arrangement and the moveable image panel relative to the fixed image panel between a first position and a second position corresponding to different IPDs; wherein the adjustment to the IPD maintains the first optical pathway. The HMD system further may include a sensing module configured to measure an adjustment position of the optical arrangement, and control electronics configured to determine the IPD based on the measured adjustment position, and to update image light emitted by the fixed image panel based on the IPD.

In exemplary embodiments, the at least one moveable image panel includes a peripheral first image panel, wherein the optical arrangement directs image light from the first image panel along a first optical pathway; a peripheral second image panel, wherein the optical arrangement directs image light from the second image panel along a second optical pathway different from the first optical pathway; and a central image panel located between the peripheral first and second image panels, the central image panel including a first panel portion and a second panel portion. The optical arrangement directs light from the first panel portion and the second panel portion of the central image panel along different optical pathways. The optical arrangement is configured such that light from the first image panel and the first panel portion of central image panel are emitted from the HMD system in a combined fashion in a first eye direction, and light from the second image panel and the second panel portion of the central image panel are emitted from the HMD system in a combined fashion in a second eye direction different from the first eye direction. The adjustment to the IPD maintains the first optical pathway and the second optical pathway, and alters the positions of the first and second image panel portions of the central image panel, and operating the adjustment mechanism moves the first and second image panels relative to the central image panel.

Figure 2:
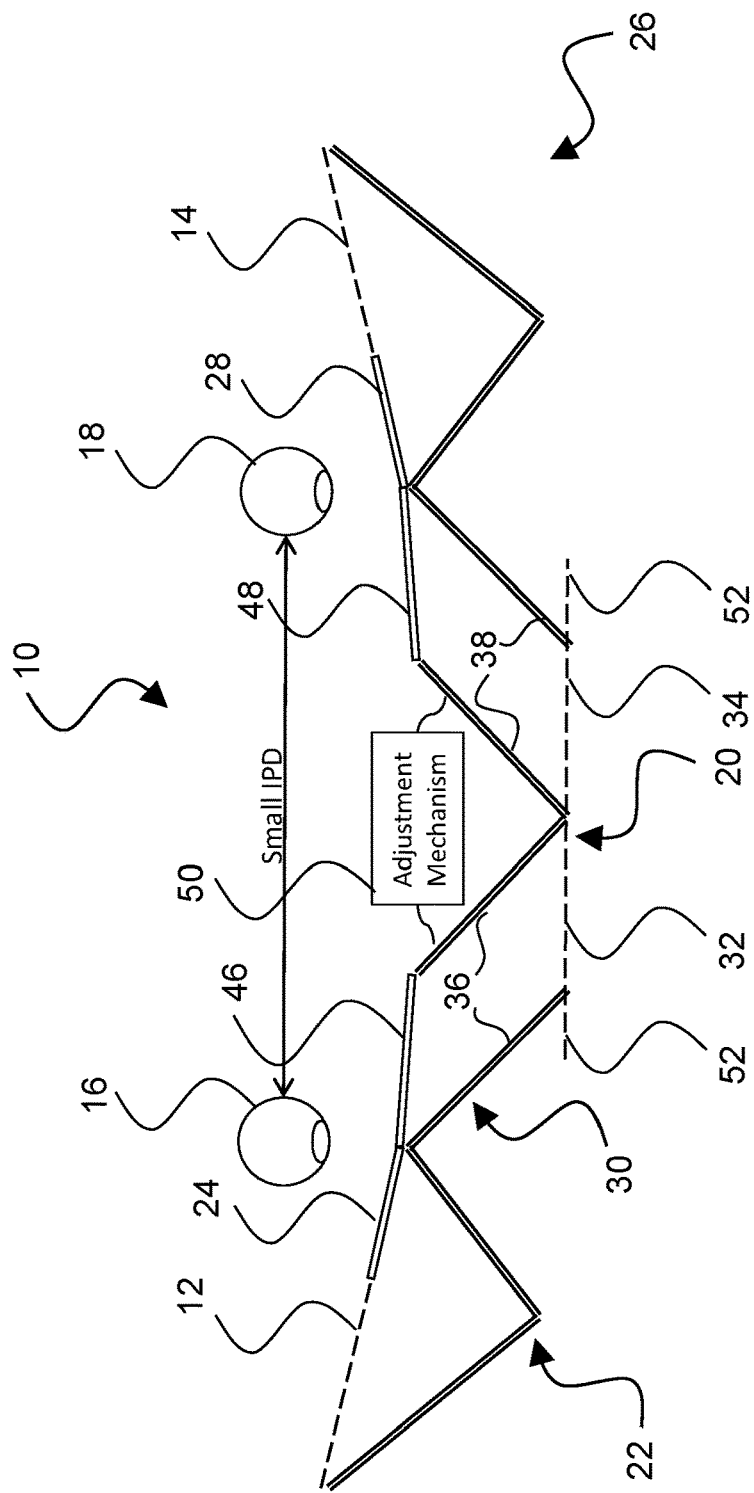
FIG. 2 is a drawing depicting a top view of the exemplary HMD system of FIG. 1, with the HMD system being in a second position of relatively small IPD.

FIG. 1 is a drawing depicting a top view of an exemplary head-mounted display (HMD) system 10 in accordance with embodiments of the present invention, with the HMD system 10 being in a first position of relatively large IPD. FIG. 2 is a drawing depicting a top view of the exemplary HMD system 10 of FIG. 1, with the HMD system being in a second position of relatively small IPD. In exemplary embodiments, the HMD system includes three image panels, which may be of equal dimensions. Referring to the figure, a first image panel 12 and a second image panel 14 are respectively used to present an image in an unshared fashion to each of the right eye 16 and the left eye 18 of a user. The HMD system 10 further includes a third or shared image panel 20 that is located centrally relative to the first and second image panels, and the third image panel 20 presents an image that is shared between both left and right eyes. Because the first and second image panels 12 and 14 are located at the periphery of the HMD device relative to central image panel 20, the first and second image panels also may be referred to as peripheral image panels.

In this primary embodiment, each of the left and right eyes can thus see two image panels, one in its entirety (emitted from the unshared first and second image panels) and half of the third central image panel that is shared by both eyes. With such a configuration, images from the various image panels are combined such that the images optimally fill the typical human visual field. The image display panels may be electronically controlled with suitable electronics incorporated into the HMD system in any suitable manner as is known in the art, so as to emit image light corresponding to the desired images from each image panel. Accordingly, for simplicity of illustration the control electronics is omitted from the figures.

In configurations of the HMD system 10, the unshared first and second peripheral image panels 12 and 14 are located on a viewing or eye side of the HMD system, close to the head. The central shared image panel 20 is located on a non-viewing or imaging side of the HMD system. An advantage of such arrangement is that the HMD system protrudes from the face for a distance less than previous designs, and therefore can have a significantly reduced weight. The system overall is positioned much closer to the face as compared to conventional configurations, and hence produces less torque relative to the head thereby reducing fatigue while wearing. The design also means near-eye optics can be used to give a large FOV, but also allows space for the user's nose to provide a more comfortable configuration to wear.

In exemplary embodiments, an optical arrangement for directing image light from the display panels includes a plurality of mirror components and a plurality of lens components, wherein the plurality of mirror components are configured to direct image light from the first, second, and central image panels along respective optical pathways to the plurality of lens components. Referring to FIG. 1, the optical arrangement may be configured as follows. As associated with the first, unshared image panel 12, the optical arrangement may include a first mirror assembly 22 directs image light from the first image panel 12 along a first optical pathway to a first lens component 24, and ultimately to the right eye 16. To minimize the size or footprint of the HMD system, the first mirror assembly 22 may be configured with a plurality of mirror segments in a "folded" or wedge-shaped arrangement, whereby the optical path of light is increased while maintaining a minimal size. With such configuration, light emitted from the first image panel 12 is directed by the mirror segments of the first mirror assembly 22 only through the first lens component 24, and thus only to one (the right) eye. The first image panel 12, therefore, is referred to as an "unshared" image panel in that the image light from the first image panel 12 is directed along the first optical pathway only to a single eye, in this case the right eye.

Similarly, as associated with the second image panel 14, the optical arrangement may include a second mirror assembly 26 that directs image light from the second, unshared image panel 14 along a second optical pathway different from the first optical pathway, to a second lens component 28 and ultimately to the left eye 18. Similarly to minimize the size or footprint of the HMD system, the second mirror assembly also may be configured with a plurality of mirror segments in a "folded" or wedge-shaped arrangement, whereby the optical path of light is increased while maintaining a minimal size. With such a configuration, light emitted from the second image panel 14 is directed by the mirror segments of the second mirror assembly 26 only through the second lens component 28, and thus only to one (the left) eye. The second image panel 14, therefore, also is an "unshared" image panel in that the image light from the second image panel 14 is directed along the different second optical pathway only to the other single eye, in this case the left eye.

As associated with the third and shared central image panel 20, the optical arrangement may include a third mirror assembly 30 that directs image light from the third image panel 20 through additional lens components as follows. The third image panel is divided into a first image panel portion 32 and a second image panel portion 34, such that image light emitted from the first image panel portion 32 is directed to one (e.g., the right) eye 16, and image light emitted from the second image panel portion 34 is directed to the other (e.g., the left) eye 18 along different optical pathways. Commensurately, the third mirror assembly 30 includes a first mirror potion 36 that directs the image light emitted from the first image panel portion 32, and a second mirror potion 38 that directs the image light emitted from the second image panel portion 34.

The third mirror assembly 30 also is configured as a plurality of mirror segments that are arranged to (1) appropriately direct the image light from the central image panel as described above, and (2) provide a compact and easily worn configuration. For particular mirror segments, the first mirror portion 36 includes a first nose segment adjacent to the user's nose when worn, and a first external segment opposite from the first nose segment. Similarly, the second first mirror portion 38 includes a second nose segment adjacent to the user's nose when worn, and a second external segment opposite from the second nose segment. The nose segments are arranged to accommodate the user's nose when the HMD system is worn, with the external segments permitting a controlled directing of the image light in a compact arrangement. As seen in FIG. 1, the first and second nose segments may meet to form a wedge shape to minimize size, and the first and second external segments may be spaced apart from and parallel to respective nose segments.

The first mirror portion 36 of the shared mirror assembly 30 directs light emitted from the first image panel portion 32 of shared image panel 20 to a third lens component 46. The second mirror portion 38 of the shared mirror assembly 30 directs light emitted from the second image panel portion 34 of shared image panel 20 to a fourth lens component 48. The third and fourth lens components respectively direct light to the right eye and left eye. Furthermore, as seen in the example of FIG. 1, the third lens component 46 may be contiguous with the first lens component 24, and the fourth lens component 48 may be contiguous with the second lens component 28. The central third image panel 20 is referred to as being a "shared" image panel, in that a portion of the image light is directed from the third image panel 20 to the right eye, and a portion of the image light is directed from the third image panel 20 to the left eye.

The HMD system 10 further includes an adjustment mechanism 50, shown in block form in FIGS. 1 and 2. As referenced above, FIG. 1 illustrates the HMD system 10 in a first position of relatively large IPD, and FIG. 2 illustrates the HMD system 10 in a second position of relatively small IPD. In other words, the HMD system 10 is adjustable between the first position and the second position, and has a different IPD in the first position as compared to the second position. The IPD of the HMD system 10 is adjustable using the adjustment mechanism 50. It is preferable that the first position of FIG. 1 corresponds to a maximum IPD, insofar as at such first position, the external segments of the mirror portions 36 and 38 are aligned with opposing edges of central image panel 20. The second position corresponds to a minimum IPD, insofar as at such second position, ends of the nose segments of the mirror portions 36 and 38 meet to form a closed wedge shape. It further will be appreciated that the HMD system may be adjusted to any adjustment position intermediate between the first and second positions of FIGS. 1 and 2.

As illustrated by comparing FIGS. 1 and 2, when the HMD system 10 is adjusted to adjust the IPD, the shared central image panel 20 remains fixed as centrally located relative to the first and second image panels. Accordingly, the shared central image panel also is referred to herein as the fixed image panel. The peripheral unshared image panels 12 and 14, along with the optical arrangement including the various mirror and lens components of the eyepieces, are free to move relative to central image panel 20 by operation of the adjustment mechanism 50. Accordingly, the peripheral unshared image panels also are referred to as moveable image panels. As shown in FIGS. 1 and 2, embodiments include the central image panel located between the peripheral first and second image panels. More generally, embodiments of the invention include at least one moveable image panel and at least one fixed image panel, with at least a portion of the image light emitted by the fixed image panel being combined with image light of the at least one moveable image panel by the optical arrangement.

As detailed above, the shared central image panel 20 is divided into a first image panel portion 32 and a second image panel portion 34, such that image light emitted from the first image panel portion 32 is directed to one (e.g., the right) eye 16, and image light emitted from the second image panel portion 34 is directed to the other (e.g., the left) eye 18 along different optical pathways. In addition, there is an unused or non-imaging panel portion 52 of the central image panel 20 that is not positioned to emit light to the optical arrangement. The location of the non-imaging panel portion 52 and the imaging panel portions 32 and 34 along the central image panel 20 will depend upon the adjustment position of the HMD system 10.

For example, in the first position of FIG. 1, the unused panel portion 52 constitutes the central portion of the image panel 20. In the second position of FIG. 2, the unused panel portion 52 constitutes peripheral portions of the image panel 20. It will be appreciated that when the HMD system 10 is at an intermediate adjustment position between the first and second positions, the unused panel portion 52 will constitute in part a central portion and peripheral portions of image panel 20. In other words, the portion of the central image panel 20 that emits light towards the lenses 46 and 48 (and with reflections off the third mirror assembly 30) changes as the HMD system 10 is adjusted to the desirable IPD. In this manner an imaging portion when the optical arrangement is in the first position differs from an imaging portion when the optical arrangement is in the second position; and a non-imaging portion when the optical arrangement is in the first position differs from a non-imaging portion when the optical arrangement is in the second position. To accommodate the change in the non-imaging portion versus the imaging portion of the central image panel 20, the control electronics (including applicable control software) must adjust the light emission from the central image panel 20 to match the image to the imaging portion of the central image panel, thereby ensuring optimum image quality.

In contrast, optical pathways for the unshared peripheral image panels 12 and 14 are not altered by the physical adjustment of the HMD system 10 to adjust the IPD. In FIGS. 1 and 2, a first portion of the optical arrangement, including mirror assembly 22 and lens segment 24, directs image light from the first image panel 12 along a first optical pathway. Similarly, a second portion of the optical arrangement, including mirror assembly 26 and lens segment 28, directs image light from the second image panel 14 along a second optical pathway different from the first optical pathway. When the optical arrangement is moved between the first and second positions to adjust the IPD, the first and second optical pathways are maintained, as the relative positioning of the components of the first and second portions of the optical arrangement is not changed relative to image panels 12 and 14. As a result, only the image emitted from the central image panel 20 needs to be updated to accommodate the physical adjustment of the HMD system to adjust the IPD.

Figure 3:
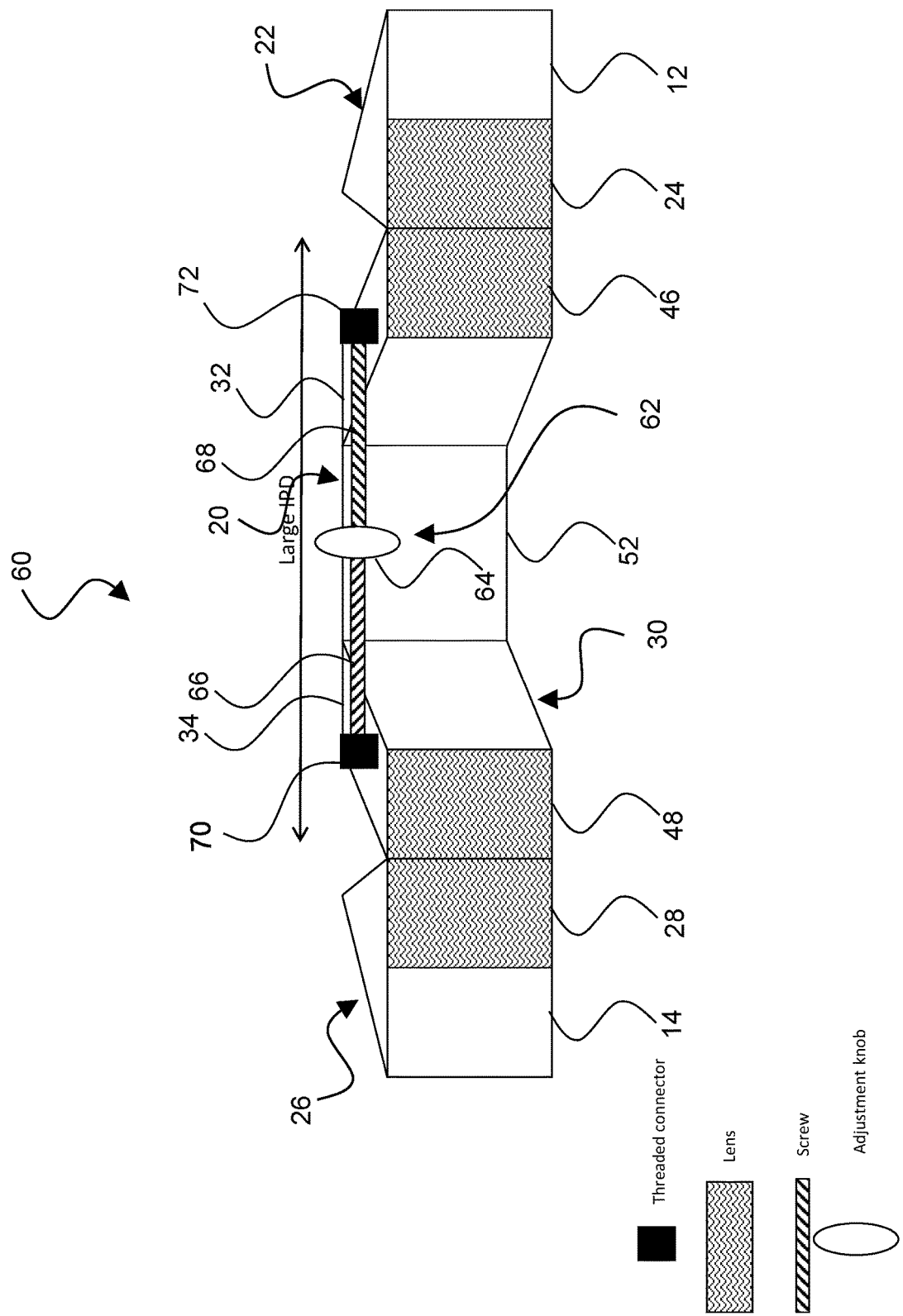
FIG. 3 is a drawing depicting an isometric view of an exemplary head-mounted display (HMD) system in accordance with embodiments of the present invention, with the HMD system being in a first position of relatively large IPD and further showing additional details of an adjustment mechanism.
Figure 4:
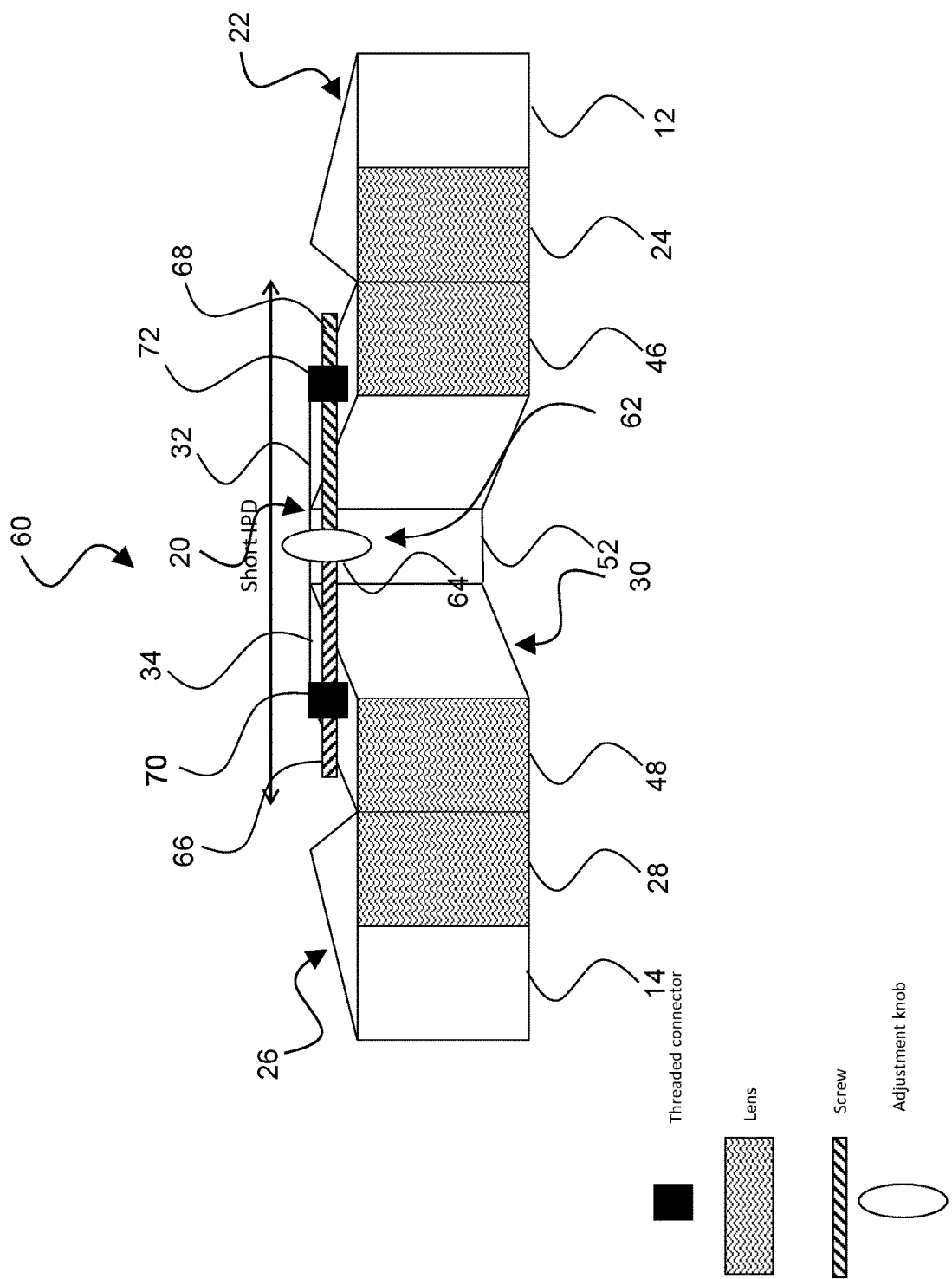
FIG. 4 is a drawing depicting an isometric view of the exemplary HMD system of FIG. 3, with the HMD system being in a second position of relatively small IPD.

FIG. 3 is a drawing depicting an isometric view of an exemplary head-mounted display (HMD) system 60 in accordance with embodiments of the present invention, with the HMD system being in a first position of relatively large IPD and further showing additional details of an adjustment mechanism 62. FIG. 4 is a drawing depicting an isometric view of the exemplary HMD system 60 of FIG. 3, with the HMD system being in a second position of relatively small IPD. The image panels, mirror components, and lens components are configured comparably as in the embodiment of FIGS. 1-2. Accordingly, reference numerals for some of the like components are omitted from FIGS. 3-6 (and likewise are omitted from subsequent figures) so as to more clearly identify the additional features of the various embodiments.

As shown in FIGS. 3 and 4, the adjustment mechanism 62 may be configured as a knob-and-screw mechanism, by which the user adjusts the IPD by rotating an adjustment knob 64 that is operable to rotate cooperating adjustment screws 66 and 68. Threaded connectors 70 and 72 are attached to the optical arrangement and receive the adjustment screws 66 and 68, so that the position of the optical arrangement adjusts as described above with the rotation of the adjustment knob 64, which results in turn in the adjustment of the IPD of the HMD system 60. The adjustment screws 66 and 68, and threaded connectors 70 and 72, are threaded such that both of the threaded connectors move towards or away from the adjustment knob 64 along the adjustment screws 66 and 68 as the adjustment knob is rotated, as seen in comparing FIGS. 3 and 4. It will be appreciated that the knob-and-screw adjustment mechanism is an example, and other suitable adjustment mechanisms may be employed to move the optical arrangement and peripheral image panels relative to the fixed central image panel.

Figure 5:
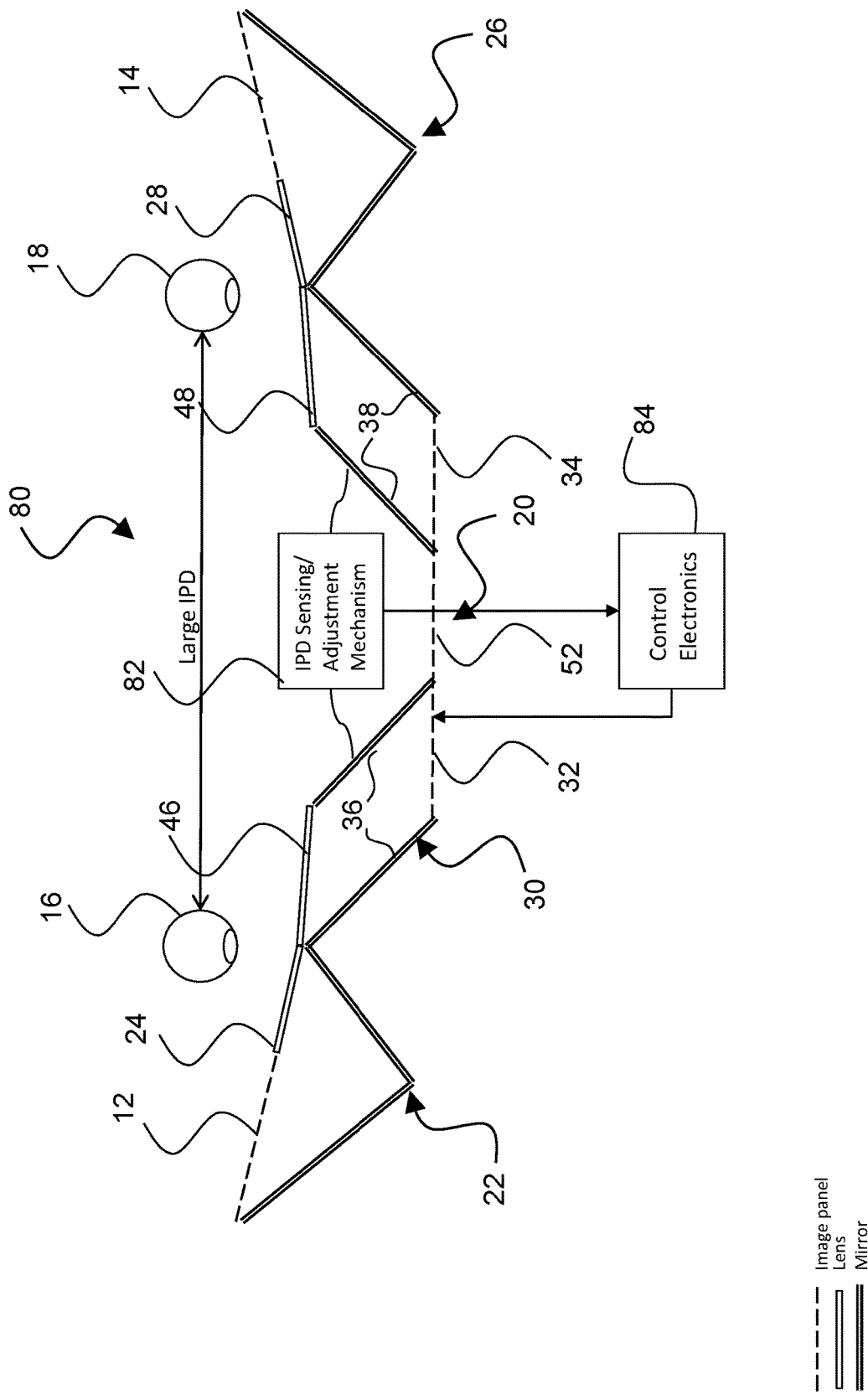
FIG. 5 is a drawing depicting a top view of an exemplary head-mounted display (HMD) system in accordance with embodiments of the present invention, with the HMD system being in a first position of relatively large IPD and further including an IPD sensing module.
Figure 6:
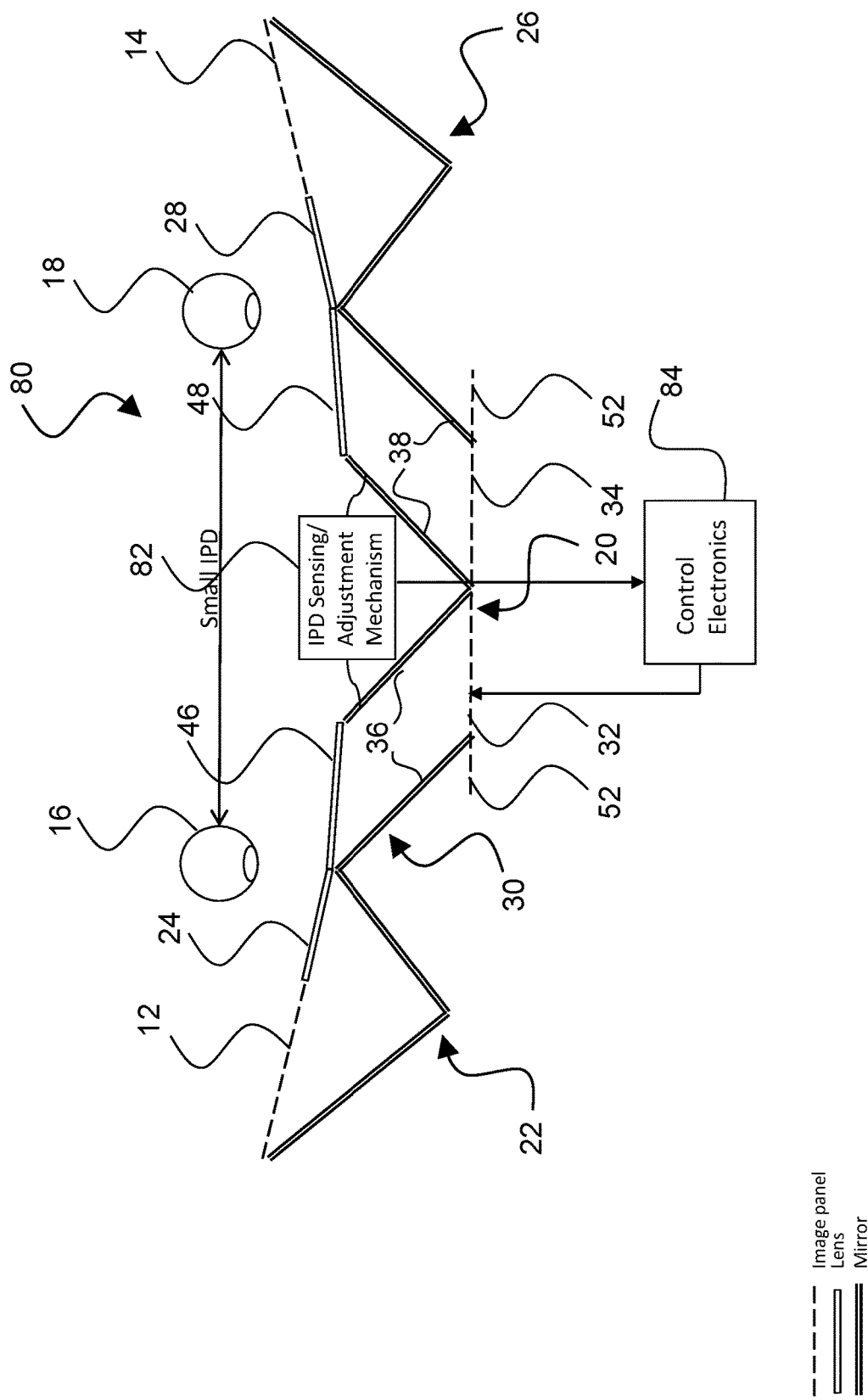
FIG. 6 is a drawing depicting a top view of the exemplary HMD system of FIG. 5, with the HMD system being in a second position of relatively small IPD.

FIG. 5 is a drawing depicting a top view of an exemplary head-mounted display (HMD) system 80 in accordance with embodiments of the present invention, with the HMD system being in a first position of relatively large IPD and further including an IPD sensing/adjustment mechanism 82. FIG. 6 is a drawing depicting a top view of the exemplary HMD system of FIG. 5, with the HMD system being in a second position of relatively small IPD. Generally, the HMD system 80 includes a sensing module, which as shown in FIGS. 5 and 6, may be combined with the adjustment mechanism into a single component. Alternatively, the sensing module may be incorporated into the HMD system 80 as a component separate from the adjustment mechanism. The sensing module includes a positional sensor that is configured to measure an adjustment position of the HMD system 80. Such sensors are well known in the industry. For screw mounted systems see for example:
https://www.sensorsmaq.com/components/understanding-linear-position-sensing-technologies, and
https://www.variohm.com/positionsensors/detail.php?sid=35&did=Non-Contacting-Linear-Position-Sensors Control electronics 84 receives the measured adjustment position from the sensing module and determines the IPD based on said adjustment position. The control electronics then determines what portion of the central image panel 20 constitutes an imaging portion of the central image panel 20 (e.g., first and second image panel portions 32 and 34), and what portion of the central image panel 20 constitutes a non-imaging or unused portion 52 of the central image panel 20. Based on such determination, the control electronics automatically updates the image light emitted from the central image panel to optimize the image correspondence with the imaging portions of the central image panel. As referenced above, the image light does not have to be updated for the unshared peripheral image panels 12 and 14 because the optical pathways for image light from the peripheral image panels is not changed when the HMD system is adjusted for IPD.

Accordingly, a method of adjusting an IPD of an HMD system includes the steps of providing an HMD system according to any of the embodiments, and operating the adjustment mechanism to adjust the IPD of the HMD system by moving the optical arrangement and a moveable image panel relative to a fixed image panel between a first position and a second position corresponding to different IPDs. The adjustment to the IPD maintains the optical pathway(s) of the at least one moveable imagining panel. The method further may include sensing an adjustment position of the optical arrangement; determining the IPD based on the sensed adjustment position; and updating image light emitted by the central image panel based on the IPD. In the context of the fixed imaging panel having an imaging portion and a non-imaging portion as described above, the method includes updating the image light emitted by the fixed image panel to optimize image correspondence with the imaging portion of the fixed image panel An aspect of the invention, therefore, is a head-mounted display (HMD) system having an enhanced image panel configuration combined with an optimal adjustment mechanism. In exemplary embodiments, the HMD system includes an optical arrangement; at least one moveable image panel, wherein the optical arrangement directs image light from the moveable image panel along a first optical pathway; a fixed image panel, wherein a portion of image light emitted from the fixed image panel is combined with image light of the at least one moveable image panel by the optical arrangement; and an adjustment mechanism that is configured adjust an interpupillary distance (IPD) of the HMD system by moving the optical arrangement and the moveable image panel relative to the fixed image panel between a first position and a second position corresponding to different IPDs. The adjustment to the IPD maintains the first optical pathway. The HMD system may include one or more of the following features, either individually or in combination.

In an exemplary embodiment of the HMD system, the fixed image panel includes an imaging portion that is positioned to emit image light into the optical arrangement to be combined with image light from the at least one moveable image panel, and a non-imaging portion that does not emit light into the optical arrangement; an imaging portion when the optical arrangement is in the first position differs from an imaging portion when the optical arrangement is in the second position; and a non-imaging portion when the optical arrangement is in the first position differs from a non-imaging portion when the optical arrangement is in the second position.

In an exemplary embodiment of the HMD system, the moveable image panel is located on a viewing side of the HMD system, and the fixed image panel is located on a non-viewing side of the HMD system.

In an exemplary embodiment of the HMD system, the adjustment mechanism comprises a knob-and-screw mechanism including: an adjustment knob that is operable to rotate cooperating adjustment screws; and threaded connectors that are attached to the optical arrangement and that receive the adjustment screws. The adjustment screws and threaded connectors are threaded such that the threaded connectors move towards or away from the adjustment knob along the adjustment screws as the adjustment knob is rotated.

In an exemplary embodiment of the HMD system, the HMD system further includes a sensing module configured to measure an adjustment position of the optical arrangement; and control electronics configured to determine the IPD based on the measured adjustment position, and to update image light emitted by the fixed image panel based on the IPD.

In an exemplary embodiment of the HMD system, the HMD system includes an optical arrangement; a first image panel, wherein the optical arrangement directs image light from the first image panel along a first optical pathway; a second image panel, wherein the optical arrangement directs image light from the second image panel along a second optical pathway different from the first optical pathway; and a central image panel located between the first image panel and the second image panel, the central image panel including a first panel portion and a second panel portion. The optical arrangement directs light from the first panel portion and the second panel portion of the central image panel along different optical pathways; and the optical arrangement is configured such that light from the first image panel and the first panel portion of central image panel are emitted from the HMD system in a combined fashion in a first eye direction, and light from the second image panel and the second panel portion of the central image panel are emitted from the HMD system in a combined fashion in a second eye direction different from the first eye direction. An adjustment mechanism is configured to adjust an interpupillary distance (IPD) of the HMD system by moving the optical arrangement and the first and second image panels relative to the central image panel between a first position and a second position corresponding to different IPDs. The adjustment to the IPD maintains the first optical pathway and the second optical pathway, and alters the positions of the first and second image panel portions of the central image panel.

In an exemplary embodiment of the HMD system, the central image panel further includes a non-imaging portion that does not emit light into the optical arrangement, and a non-imaging portion when the optical arrangement is in the first position differs from a non-imaging portion when the optical arrangement is in the second position.

In an exemplary embodiment of the HMD system, the first and second image panels are located on a viewing side of the HMD system, and the central image panel is located on a non-viewing side of the HMD system.

In an exemplary embodiment of the HMD system, the optical arrangement comprises a plurality of mirror components and a plurality of lens components, wherein the plurality of mirror components are configured to direct image light from the first, second, and central image panels along respective optical pathways to the plurality of lens components.

In an exemplary embodiment of the HMD system, the optical arrangement includes a first mirror assembly that directs image light from the first image panel to a first lens component; the optical arrangement includes a second mirror assembly that directs image light from the second image panel to a second lens component; and the optical arrangement further comprises a third mirror assembly that includes a first mirror portion that directs image light from the first panel portion of the central image panel to a third lens component, and a second mirror portion that directs image light from the second panel portion of the central image panel to a fourth lens component.

In an exemplary embodiment of the HMD system, the first mirror assembly and the second mirror assembly each has a folded arrangement including a plurality of mirror segments.

In an exemplary embodiment of the HMD system, the third mirror assembly includes first and second nose segments that meet to form a wedge shape, and first and second external segments that are spaced apart from and parallel to respective nose segments.

Another aspect of the invention is method of adjusting an interpupillary distance (IPD) of a head-mounted display (HMD) system including the steps of: providing an HMD system accordingly to any of the embodiments; and operating the adjustment mechanism to adjust the IPD of the HMD system by moving the optical arrangement and the moveable image panel relative to the fixed image panel between a first position and a second position corresponding to different IPDs; wherein the adjustment to the IPD maintains the first optical pathway. The method of adjusting an IPD may include one or more of the following features, either individually or in combination.

In an exemplary embodiment of the method of adjusting an IPD, the method further includes sensing an adjustment position of the optical arrangement; determining the IPD based on the sensed adjustment position; and updating image light emitted by the central image panel based on the IPD.

In an exemplary embodiment of the method of adjusting an IPD, the at least one moveable image panel comprises a peripheral first image panel and a peripheral second image panel, and the fixed image panel comprises a central image panel located between the first and second image panels; and operating the adjustment mechanism moves the first and second image panels relative to the central image panel.

In an exemplary embodiment of the method of adjusting an IPD, the fixed image panel includes a first panel portion and a second panel portion; the optical arrangement directs light from the first panel portion and the second panel portion of the central image panel along different optical pathways; and operating the adjustment mechanism changes locations of the first panel portion and the second panel portion along the fixed image panel.

In an exemplary embodiment of the method of adjusting an IPD, the fixed image panel includes an imaging portion that is positioned to emit image light into the optical arrangement to be combined with image light of the at least one moveable image panel, and a non-imaging portion that does not emit light into the optical arrangement; an imaging portion when the optical arrangement is in the first position differs from an imaging portion when the optical arrangement is in the second position; and a non-imaging portion when the optical arrangement is in the first position differs from a non-imaging portion when the optical arrangement is in the second position.

In an exemplary embodiment of the method of adjusting an IPD, the method further includes updating the image light emitted by the fixed image panel to optimize image correspondence with the imaging portion of the fixed image panel.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention relates to wearable displays, in particular for achieving small and light weight head-mounted display (HMD) systems. Hardware manufactured using this disclosure may be useful in the fields of virtual reality (VR) and augmented reality (AR) for both consumer and professional markets.

HMD systems manufactured in accordance with this disclosure could have applications including gaming, entertainment, task support, medical, industrial design, navigation, transport, translation, education, and training.

REFERENCE SIGNS LIST

10—head-mounted display (HMD) system
12—first image panel
14—second image panel
16—right eye
18—left eye
20—third or shared image panel
22—first mirror assembly
24—first lens component
26—second mirror assembly
28—second lens component
30—third mirror assembly
32—first image panel portion
34—second image panel portion
36—first mirror portion
38—second mirror portion
46—third lens component
48—fourth lens component
50—adjustment mechanism
52—unused or non-imaging panel portion
60—head-mounted display (HMD) system
62—adjustment mechanism
64—adjustment knob
66—adjustment screw
68—adjustment screw
70—threaded connector
72—threaded connector
80—head-mounted display system
82—adjustment mechanism
84—control electronics

What is claimed is:

1. A head-mounted display (HMD) system comprising:
an optical arrangement;
at least one moveable image panel, wherein the optical arrangement directs image light from the moveable image panel along a first optical pathway;
a fixed image panel, wherein a portion of image light emitted from the fixed image panel is combined with image light of the at least one moveable image panel by the optical arrangement; and
an adjustment mechanism that is configured adjust an interpupillary distance (IPD) of the HMD system by moving the optical arrangement and the moveable image panel relative to the fixed image panel between a first position and a second position corresponding to different IPDs;
wherein the adjustment to the IPD maintains the first optical pathway;
the fixed image panel includes an imaging portion that is positioned to emit image light into the optical arrangement to be combined with image light from the at least one moveable image panel, and a non-imaging portion that does not emit light into the optical arrangement;
an imaging portion when the optical arrangement is in the first position differs from an imaging portion when the optical arrangement is in the second position; and
a non-imaging portion when the optical arrangement is in the first position differs from a non-imaging portion when the optical arrangement is in the second position.

2. The HMD system of claim of claim 1, wherein the moveable image panel is located on a viewing side of the HMD system, and the fixed image panel is located on a non-viewing side of the HMD system.

3. The HMD system of claim 1, wherein the adjustment mechanism comprises a knob-and-screw mechanism including:
an adjustment knob that is operable to rotate cooperating adjustment screws; and
threaded connectors that are attached to the optical arrangement and that receive the adjustment screws;
wherein the adjustment screws and threaded connectors are threaded such that the threaded connectors move towards or away from the adjustment knob along the adjustment screws as the adjustment knob is rotated.

4. The HMD system of claim 1, further comprising:
a sensing module configured to measure an adjustment position of the optical arrangement; and control electronics configured to determine the IPD based on the measured adjustment position, and to update image light emitted by the fixed image panel based on the IPD.

5. The HMD system of claim 1, wherein the non-imaging portion extends outside of the optical arrangement in a lateral direction to be positioned not to emit light into the optical arrangement.

6. A head-mounted display (HMD) system comprising:
an optical arrangement;
a first image panel, wherein the optical arrangement directs image light from the first image panel along a first optical pathway;
a second image panel, wherein the optical arrangement directs image light from the second image panel along a second optical pathway different from the first optical pathway;
a central image panel located between the first image panel and the second image panel, the central image panel including a first panel portion and a second panel portion;
wherein the optical arrangement directs light from the first panel portion and the second panel portion of the central image panel along different optical pathways; and
wherein the optical arrangement is configured such that light from the first image panel and the first panel portion of central image panel are emitted from the HMD system in a combined fashion in a first eye direction, and light from the second image panel and the second panel portion of the central image panel are emitted from the HMD system in a combined fashion in a second eye direction different from the first eye direction; and
an adjustment mechanism that is configured adjust an interpupillary distance (IPD) of the HMD system by moving the optical arrangement and the first and second image panels relative to the central image panel between a first position and a second position corresponding to different IPDs;
wherein the adjustment to the IPD maintains the first optical pathway and the second optical pathway, and alters the positions of the first and second image panel portions of the central image panel.

7. The HMD system of claim 6, wherein the central image panel further includes a non-imaging portion that does not emit light into the optical arrangement, and a non-imaging portion when the optical arrangement is in the first position differs from a non-imaging portion when the optical arrangement is in the second position.

8. The HMD system of claim 6, wherein the first and second image panels are located on a viewing side of the HMD system, and the central image panel is located on a non-viewing side of the HMD system.

9. The HMD system of claim 6, wherein the adjustment mechanism comprises a knob-and-screw mechanism including:
an adjustment knob that is operable to rotate cooperating adjustment screws; and
threaded connectors that are attached to the optical arrangement and that receive the adjustment screws;
wherein the adjustment screws and threaded connectors are threaded such that the threaded connectors move towards or away from the adjustment knob along the adjustment screws as the adjustment knob is rotated.

10. The HMD system of claim 6, further comprising:
a sensing module configured to measure an adjustment position of the optical arrangement; and
control electronics configured to determine the IPD based on the measured adjustment position, and to update image light emitted by the central image panel based on the IPD.

11. The HMD system of claim 6, wherein the optical arrangement comprises a plurality of mirror components and a plurality of lens components, wherein the plurality of mirror components are configured to direct image light from the first, second, and central image panels along respective optical pathways to the plurality of lens components.

12. The HMD system of claim 11, wherein:
the optical arrangement includes a first mirror assembly that directs image light from the first image panel to a first lens component;
the optical arrangement includes a second mirror assembly that directs image light from the second image panel to a second lens component; and
the optical arrangement further comprises a third mirror assembly that includes a first mirror portion that directs image light from the first panel portion of the central image panel to a third lens component, and a second mirror portion that directs image light from the second panel portion of the central image panel to a fourth lens component.

13. The HMD system of claim 12, wherein the first mirror assembly and the second mirror assembly each has a folded arrangement including a plurality of mirror segments.

14. The HMD system of claim 12, wherein the third mirror assembly includes first and second nose segments that meet to form a wedge shape, and first and second external segments that are spaced apart from and parallel to respective nose segments.

15. A method of adjusting an interpupillary distance (IPD) of a head-mounted display (HMD) system comprising the steps of:
providing an HMD system including an optical arrangement; at least one moveable image panel, wherein the optical arrangement directs image light from the moveable image panel along a first optical pathway; a fixed image panel, wherein a portion of image light emitted from the fixed image panel is combined with image light of the at least one moveable image panel by the optical arrangement; and an adjustment mechanism; and
operating the adjustment mechanism to adjust the IPD of the HMD system by moving the optical arrangement and the moveable image panel relative to the fixed image panel between a first position and a second position corresponding to different IPDs;
wherein the adjustment to the IPD maintains the first optical pathway;
the fixed image panel includes a first panel portion and a second panel portion;
the optical arrangement directs light from the first panel portion and the second panel portion of the fixed image panel along different optical pathways; and
operating the adjustment mechanism changes locations of the first panel portion and the second panel portion along the fixed image panel.

16. The method of adjusting an IPD of claim 15, further comprising:
sensing an adjustment position of the optical arrangement;
determining the IPD based on the sensed adjustment position; and updating image light emitted by the fixed image panel based on the IPD.

17. The method of adjusting an IPD of claim 16, wherein:
the fixed image panel includes an imaging portion that is positioned to emit image light into the optical arrangement to be combined with image light of the at least one moveable image panel, and a non-imaging portion that does not emit light into the optical arrangement;
an imaging portion when the optical arrangement is in the first position differs from an imaging portion when the optical arrangement is in the second position; and
a non-imaging portion when the optical arrangement is in the first position differs from a non-imaging portion when the optical arrangement is in the second position.

18. The method of adjusting an IPD of claim 17, further comprising updating the image light emitted by the fixed image panel to optimize image correspondence with the imaging portion of the fixed image panel.

19. The method of adjusting an IPD of claim 15; wherein:
the at least one moveable image panel comprises a peripheral first image panel and a peripheral second image panel, and the fixed image panel comprises a central image panel located between the first and second image panels; and
operating the adjustment mechanism moves the first and second image panels relative to the central image panel.

* * * * *